United States Patent
Ahrens

(10) Patent No.: US 8,490,576 B2
(45) Date of Patent: Jul. 23, 2013

(54) MILKING PARLOUR AND METHOD FOR THE PRODUCTION THEREOF

(75) Inventor: Matthias Ahrens, Lippetal (DE)

(73) Assignee: GEA Farm Technologies GmbH, Boenen (DE)

( * ) Notice: Subject to any disclaimer, the term of this patent is extended or adjusted under 35 U.S.C. 154(b) by 855 days.

(21) Appl. No.: 11/922,195

(22) PCT Filed: Jun. 14, 2006

(86) PCT No.: PCT/EP2006/005702
§ 371 (c)(1),
(2), (4) Date: Apr. 22, 2009

(87) PCT Pub. No.: WO2006/133915
PCT Pub. Date: Dec. 21, 2006

(65) Prior Publication Data
US 2009/0255472 A1    Oct. 15, 2009

(30) Foreign Application Priority Data
Jun. 16, 2005    (DE) .................... 10 2005 028 108

(51) Int. Cl.
*A01J 5/00* (2006.01)
*A01K 1/12* (2006.01)
(52) U.S. Cl.
USPC ............................................. 119/14.03
(58) Field of Classification Search
USPC ........... 119/14.01–14.05, 14.18, 14.1, 14.13, 119/14.14, 520
See application file for complete search history.

(56) References Cited

U.S. PATENT DOCUMENTS

| 3,261,323 A | * | 7/1966 | Steelhammer | 119/14.04 |
| 4,006,712 A | * | 2/1977 | Peel | 119/14.03 |
| 4,207,837 A | * | 6/1980 | Schwartau et al. | 119/14.03 |
| 4,867,103 A | * | 9/1989 | Montalescot et al. | 119/14.08 |
| 5,137,738 A | * | 8/1992 | Wynn | 426/231 |
| 5,361,722 A | * | 11/1994 | Tecza | 119/14.03 |
| 5,791,283 A | * | 8/1998 | Schulte | 119/14.1 |
| 5,809,931 A | * | 9/1998 | Ellis et al. | 119/14.08 |

(Continued)

FOREIGN PATENT DOCUMENTS
DE    26 23 499 A1    12/1977
DE    36 89 972 T2    2/1995

(Continued)

OTHER PUBLICATIONS

English language Translated Description and Claims of DE 26 23 499, European Patent Office's esp@cenet.com database, 4pp, Dec. 8, 1996.

(Continued)

*Primary Examiner* — Rob Swiatek
*Assistant Examiner* — Ebony Evans
(74) *Attorney, Agent, or Firm* — Smith Law Office

(57) ABSTRACT

The invention relates to a milking parlor and a method for manufacturing same, the milking parlor comprising a work area for an operator and a platform elevated relative to the area, which forms a standing and walking area for the animals to be milked, the platform comprising a substructure on its side facing the work area where a utility space is left open beneath the standing and walking area, and wherein the substructure is formed by load-bearing elements positioned one after the other in the lengthwise direction and configured to be substantially identical.

26 Claims, 11 Drawing Sheets

U.S. PATENT DOCUMENTS

| | | | | |
|---|---|---|---|---|
| 5,960,738 A | * | 10/1999 | Sanford | 119/14.45 |
| 6,336,424 B1 | * | 1/2002 | Kullberg et al. | 119/14.2 |
| 6,948,449 B2 | * | 9/2005 | Van der Lingen et al. | 119/14.13 |
| 2004/0020441 A1 | * | 2/2004 | Reisgies | 119/14.04 |
| 2008/0178811 A1 | * | 7/2008 | Heinrich | 119/14.04 |

FOREIGN PATENT DOCUMENTS

| | | |
|---|---|---|
| DE | 44 22 402 A1 | 1/1996 |
| EP | 0 191 517 A1 | 8/1986 |
| EP | 0 349 019 A2 | 1/1990 |
| EP | 0 322 404 B1 | 7/1994 |
| EP | 1 294 222 B1 | 10/2004 |
| EP | 1 616 483 A1 | 1/2006 |
| NL | 1 021 927 C | 5/2004 |
| WO | WO 98/31212 | 7/1998 |
| WO | WO 03/096802 A1 | 11/2003 |
| WO | WO 2006/068589 A1 | 6/2006 |

OTHER PUBLICATIONS

English language Abstract, Translated Description and Claims of DE 44 22 402 A1, European Patent Office's esp@cenet.com database, 3pp, Jan. 4, 1996.

English language Abstract, Translated Description and Claims of EP 1 616 483 A1, European Patent Office's esp@cenet.com database, 6pp, Jan. 18, 2006.

English language Abstract of NL 1 021 927 C, European Patent Office's esp@cenet.com database, 1p, May 18, 2004.

* cited by examiner

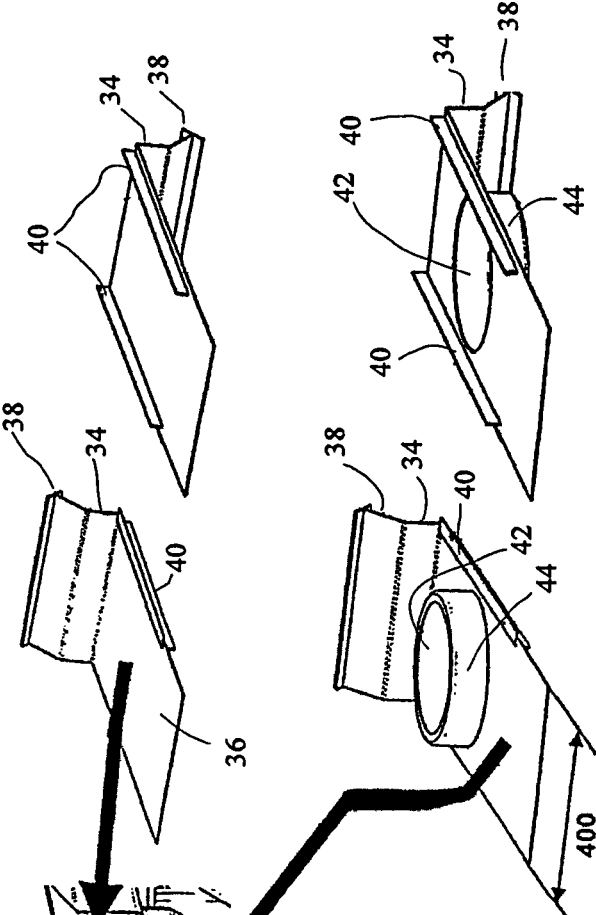
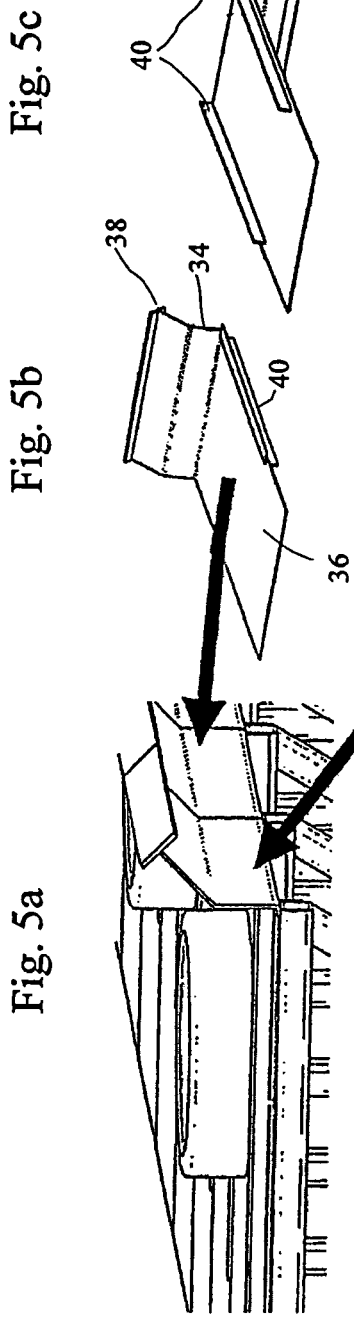
Fig. 5a
Fig. 5b
Fig. 5c
Fig. 5d
Fig. 5e

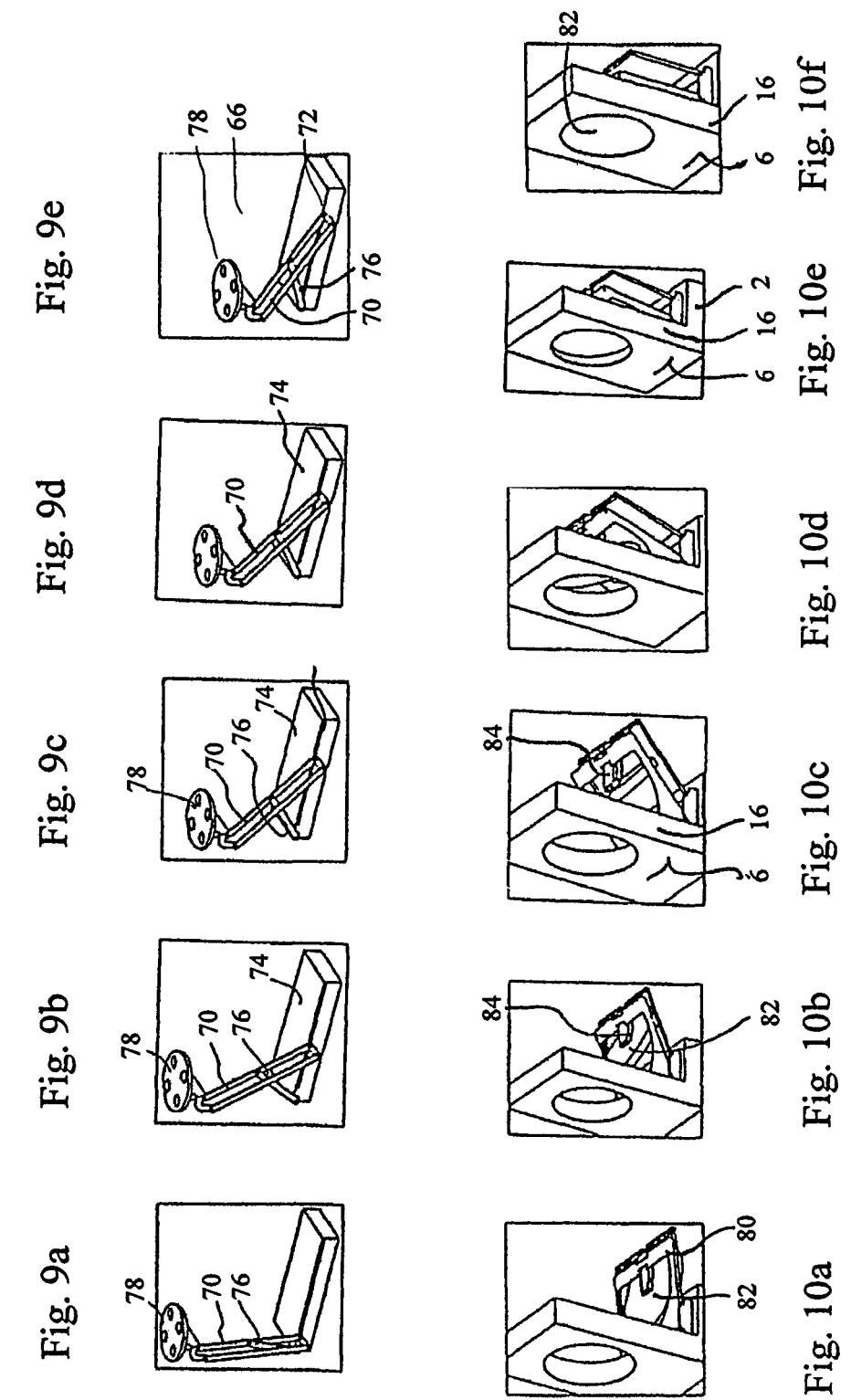

MILKING PARLOUR AND METHOD FOR THE PRODUCTION THEREOF

FIELD AND BACKGROUND OF THE INVENTION

The present invention relates to a milking parlor with a work area for an operator of the milking parlor and a platform elevated relative to said area, which forms a standing and walking area for the animal to be milked. The present invention further relates to a method for manufacturing said milking parlor.

In modern-day milking technology, in particular for use with large herds, the milk is usually extracted in milking parlors. For reasons of ergonomics these are configured such that the animal to be milked is standing on a platform and the operator, in a work area separated by barrier grids from the standing and walking area configured on said platform, and with the floor lying beneath said standing and walking area.

In the prior art of the relevant category, the platform which is preferably located at the two longitudinal sides of the work area, is a solid structure. A milking parlor may be formed e.g. as a herringbone milking parlor or an autotandem or a side-by-side milking parlor (SBS). The platform forms the walkway for the animals to be milked configured e.g. as a drive-through alley. In this case, a number of milking places arranged on the platform one behind the other may be occupied with animals to be milked independently from one another. Each milking place is accessible from outside for an animal to be milked. Or else, the milking places may be configured on the platform in a so-called herringbone arrangement. In this case the entire platform surface is used both as a standing and as a walking area for the animals to be milked. The animals are standing substantially oblique or perpendicular (SBS) to the longitudinal extension of the walking alley with their rear ends in the work area.

The operator can reach the udder of the animals to be milked through the barrier grids located at the platform edge, perform placement of the milking unit from there and/or supervise automatic placement. For this purpose the operator must be able to approach the platform edge next to the work area as closely as possible. Based on the system there are located, in particular on the platform side wall facing the work area, media lines in particular for discharging the extracted milk and for connecting a pulsator provided at each milking place associated with a milking unit and connected with a subpressure source. The side wall may furthermore comprise electric supply lines and sensor lines for controlling and/or checking particular milking places or the entire milking installation.

The transition between the work area and the platform, usually above the standing and walking area, is furthermore frequently provided with display and input devices for each milking place for controlling the pulsator provided and/or for reading performance data on the animal currently at the milking place. In view of ready access to the udders of the animals to be milked these devices are located above the head of the user which is unsatisfactory for reasons of ergonomics.

Manufacturers of milking parlors of the type indicated above do make efforts to suitably configure a so-called bordered pit edge as a boundary to the platform side wall and the walking area on the work area side so as to provide neat connections, holders and guides for the different cables and devices of the milking parlor. Nevertheless there is a plurality of lines, hoses, and connections on the sidewall on the operator side. These may interfere with neatness and obstruct free access to the animal and furthermore they may spoil the outward appearance of the milking parlor. Moreover the many edges and recesses between and behind lines and connections offer opportunities for dirt and bacteria to accumulate, inhibiting the cleaning and disinfecting of the milking parlor which is indispensable for hygienic reasons.

SUMMARY OF THE INVENTION

It is the object of the present invention to provide a milking parlor in which the drawbacks indicated above are entirely absent or at least in part. The present invention is further based on the objective to provide a method for manufacturing such a milking parlor.

To solve the problem above by way of an apparatus the present invention improves the milking parlor indicated initially in that the platform comprises a substructure on the side facing the work area where a utility space is left open beneath the standing and walking area. The substructure is formed by load-bearing elements positioned one after the other in the lengthwise direction and configured to be substantially identical. Deviating from milking parlors known from the prior art having a stationary platform, said platform according to the invention is not manufactured entirely solid, such as made of cast concrete or brickwork. A portion of the platform, approximately 20 to 70% of its width, are formed by a substructure. Said substructure is positioned on the work area side such that milking parlor equipment which the operator needs to observe and/or to operate can be located in the utility space. Accordingly, the indicated milking parlor furnishings which the user needs to access during milking or a connection for each piece of equipment provided for each milking place may be placed in the utility space. The invention leaves open the option of shifting all of the pieces of equipment which in the prior art are exposed on the side wall, to the interior of the utility space which is closed with a cover to form said side wall, where only connections and interfaces to the work area may remain exposed.

Employing substantially identically shaped load-bearing elements allows a particularly economical configuration.

The preferred configuration of the inventive milking parlor allows in particular to arrange the media lines of the milking parlor which in general extend in the longitudinal direction. These include in particular, the milk line for discharging extracted milk, the compressed air line for the pulsators, if applicable a disinfection or rinsing line for rinsing the milking units before placing them on the next animal. In this preferred embodiment the utility space is configured to be continuous in the longitudinal direction at least in part, meaning that the utility space may certainly be provided with supports and struts or the like. These are, however, aligned lengthwise such that between supporting elements there is an open, continuous receiving space in the longitudinal direction for media lines which also extend in the longitudinal direction.

Preferably the substructure comprises milking parlor modules configured in particular identically.

Each of said load-bearing elements preferably extends transverse to the lengthwise direction, i.e. transverse to the elongated standing or walking area of the platform. The modular load-bearing elements allow extending the platform as desired at reduced manufacturing costs.

According to another preferred embodiment of the present invention the utility space formed beneath the standing and walking area is preferably sealed against contamination by the animals standing on the standing and walking area in the way that two adjacent load-bearing elements are provided with a covering element on their top surfaces. In view of simplicity of manufacture and the modular structure of the substructure the load-bearing elements are intended to have the same lateral distance to one another.

Preferably the covering elements completely seal the utility space against the top surface. This occurs in particular by way of adjacent covering elements having an overhang, i.e. they overlap when mounted in place.

To protect the animals to be milked from injuries and the operator being in the work area from kicks of the animals to be milked it is furthermore preferred to configure the covering elements with a bordered edge as a boundary along the sides of the standing and walking area. In order to allow simple and neat cleaning and disinfecting of the inventive milking parlor, said bordered edge is preferably flush with, passing without any steps into, the side wall.

To better protect the utility space from entering dirt and in particular against the animals moving on the standing and walking area, another preferred embodiment proposes a floor plate as a platform cover, extending both over the solid, cast or brick-built platform area and the substructure. Said floor plate is made of a curable material which is applied in a non-cured condition on the top surface of the platform and the covering elements, i.e. in site, and as the platform has been built, is given its final shape to create a uniform standing and walking area, sealing the top surface of the utility space. The curable material employed may for example be concrete. In view of a skid-proof surface it is also conceivable to apply curable plastic material on the top face of the platform and the covering elements. In a way per se known, non-skid plastic sheeting or tiles may certainly be applied on the floor plate.

In respect of rendering a milking unit in the utility space accessible, it is preferable to provide at least one covering element per milking place which has an aperture protruding beyond the top surface of the covering element and substantially cylindrical or conical or else can-like in shape. Inside the can-like aperture a free recess offers access to the utility space. The cast floor plate is configured not higher than and ideally at the same height as the can-shaped aperture for the border of the can-shaped aperture in combination with the floor plate to form a plane surface allowing access to the utility space.

Preferably the media and/or electric supply lines, and sensor lines as required, are mounted in the utility space as known per se, in the longitudinal direction of the standing and walking area and thus of the platform. The utility space is further provided with operation modules which in the mounted condition are in communication with these lines (media lines, electric supply lines, or sensor lines) via pre-defined interfaces. This preferred embodiment allows to position in the utility space, as required, all of the equipment pieces of the milking parlor intended to be brought close to the animal to be milked and to connect them with the corresponding lines. The platform side wall may be flat and even. The milking unit may be lifted up from beneath through the can-shaped aperture in the direction of the animal to be milked for manual or automatic placement.

For ease of mounting of the corresponding operation modules the utility space preferably comprises a guiding device to each operation module through which said module can be inserted from the work area into the utility space. This configuration allows easy building up of the milking parlor and uncomplicated exchange of operation modules which are defective or due for maintenance.

Due to the modular arrangement of the load-bearing elements, i.e. due to the utility space divided up in the longitudinal direction, each milking place is preferably provided with multiple operation modules with different functions and in view of ease of exchanging adjacent operation modules it is preferred that they comprise mating interfaces. Said interfaces are located in the utility space and preferably configured so as to allow easy connection of opposite operation modules. It is likewise conceivable to provide opposite side faces of the operation modules with interfaces for wireless data transmission between the operation modules.

For ease of mounting it is preferred to configure the modules substantially U-shaped. The opposite legs of the U-shaped operation modules substantially extend in the horizontal direction wherein the bottom leg of the operation module forms a mounting surface for placement to the guiding device or the floor of the utility space and the top leg is provided to be higher than the bottom leg, comprising an operation unit comprised in the operation module. Between the top and the bottom leg there are preferably positioned the media and/or electric supply or sensor lines. These are preferably connected with the link bridging the legs or the bottom link.

According to another preferred embodiment of the present invention said link bridging the legs or a covering over them comprises on its outside facing the work area, input and/or display elements of the operation module and/or interfaces for said elements. The interfaces may be wireless interfaces for data input and output between the module and a panel carried by the operator.

Preferably, adjacent operation modules positioned in the utility space form a covering towards the work area through which the utility space is closed relative to the work area without any slit. To this end the operation modules inserted into the utility space may be sealingly screwed to the substructure or to one another.

As already mentioned, it is preferred for reasons of hygiene to configure the sidewall as smooth and flat as possible.

Preferably the utility space for each milking place is provided with an associated milking unit module comprising a set of teat cups which can be placed on the udder of the animal to be milked. In the standing and walking area near each milking place there may be a recess leading to the utility space to which the milking unit module is associated wherein the milking unit module comprises a closing unit to cover the recess in a non-use position of the teat cups.

According to another preferred embodiment of the present invention it is proposed to leave in the standing and walking area a recess to the utility space at each milking place and in the utility space, to place a milking unit module associated to the recess having a set of teat cups to be placed on the udder of the animal to be milked. In this configuration, the teat cups are placed through the level in which the standing and walking area lies. To prevent contamination of the milking unit it is furthermore preferred to form a closing unit at the milking unit module so as to cover the recess in a non-use position of the teat cups. Said covering tightly closes the open recess in the standing and walking area so as to prevent dirt from the animals to be milked from entering the utility space with the teat cups in a non-use position.

To enhance accessibility of the teat cups, the milking unit module comprises an operating device for displacing the teat cups from the non-use position to a use position. In the non-use position the teat cups are beneath the standing and walking area. In the use position they are preferably above said surface and are or can be placed on the udder.

The device mentioned above preferably comprises a pivoted arm which carries a teat cup magazine at its free end and whose other end is mounted in a guide to be movable, e.g. displaceable and pivotable. The teat cup magazine comprises a receiver for each teat cup of the milking unit. The configuration mentioned above allows e.g. the forming of a scissors-type operating device which was found to be especially robust.

To configure a closing unit to be space-saving it is preferred to configure it with a pivoted element which for covering the recess can be pivoted into a position in which the pivoted element extends substantially parallel to the standing and walking area. Said pivoted element bears a closing lid which can be pivoted relative to the pivoted element to cover the recess and can be inserted flush into the recess. The recess is closed by the closing lid when the pivoted element is parallel to the standing and walking area. In a rest position pivoted from this position approximately 90° the recess is freely accessible. The fact that the closing lid is pivotable relative to the pivoted element allows a particularly space-saving arrangement of the closing unit in the utility space in this position.

According to another preferred embodiment of the present invention, each milking place has a milking module provided for it which comprises a pulsator for the milking unit at the milking place. Correspondingly, both control and supply of the milking unit with compressed air and discharge of extracted milk occurs through an operation module, which in the present case is configured as a milking module, positioned in the utility space.

Finally, according to another preferred embodiment, a cleaning and/or disinfecting device may be provided in the utility space by means of which the milking unit of the associated milking module can be cleaned and/or disinfected. Consequently the lines provided for cleaning and/or disinfecting fluids may be fed through the utility space as well. The work area will not get wet from cleaning and disinfecting fluids during the entire milking process. This is because the cleaning and/or disinfecting device mentioned before serves to flush, clean and disinfect between milking runs, i.e. before the milking unit is placed on an animal to be milked. Additionally the cleaning and/or disinfecting device may comprise a spray nozzle to spray the teat now received in the teat cup with cleaning or disinfecting fluids before milk is drawn.

There may occasionally be a need to separate milk drawn first which may be contaminated by cleaning and/or disinfecting fluids, from milk drawn later. An appropriate milk separator may be controlled by a sensor analyzing the liquid flowing from the teat cup which offers the opportunity of discharging milk not fulfilling the quality criteria, so as to not mix it in the milk line with milk fulfilling the quality criteria.

The milking parlor according to the invention offers the option by way of its modular structure to configure the platform simple but with an additional function consisting in that a utility space is provided beneath the platform in which components, lines and the like for the installation may be positioned. The preferred positioning of operation modules in the utility space also offers advantages of a modular concept wherein operation modules may be exchanged individually as needed and if one module fails, only that milking place will be affected but not the entire milking parlor. Moreover the preferably provided operation modules are individualized according to further preferred embodiments and capable of performing all of the functions required for milking including energy supply, control and analysis of the performance data of the animal to be milked and/or the monitoring of the extracted milk. A flat, even covering of the utility space can thus provide an optically appealing milking parlor that is easy to clean and wherein also the operator may approach the animal to be milked very closely without being impeded by exposed lines and connections.

All of the embodiments preferably provide that the milking parlor is manufactured of a fiber-reinforced plastic at least in part. This offers considerable advantages since these parts are lightweight and can be manufactured in series. Moreover they can withstand very high loads applied in specific directions which complies with the application. Preferably at least part of the substructure and in particular at least one load-bearing element or at least one milking parlor module consists of fiber-reinforced plastic. It is further particularly advantageous for at least one operation module to consist of fiber-reinforced plastic.

The reinforcing material of the fiber-reinforced plastic is preferably taken from a group of fibrous materials comprising carbon fibers, glass fibers, basalt fibers, ceramic fibers, metallic fibers and in particular steel fibers, and aramid fibers and boron fibers und the like. It is particularly preferred to use carbon fibers or glass fibers.

The matrix material employed may be a thermoplastic or a thermosetting material. Thermosetting materials offer the advantage that the matrix material cures at room temperature. Thermoplastic materials in turn can be stored indefinitely and they may be welded. In this way it is easy to repair cracks in the material.

In all of the configurations preferably at least one carrier element is configured as a modular milking parlor element which forms part of the substructure for two milking places separated by the milker pit. This has considerable advantages. The modular milking parlor element provides part of the substructure for two milking places separated by the milker pit, and the center area as the standing area in the milker pit.

Preferably a substantial part of the substructure or the entire substructure of the milking parlor is then configured by a plurality of consecutive, modular milking parlor elements arranged in particular in parallel. In this way the milking parlor does not require work-intensive formwork e.g. for casting concrete.

The milking parlor elements preferably consist of fiber-reinforced plastic. The milking parlor elements may be manufactured as semi-finished products and transported to the provided mounting site on trucks or the like. The low weight of the modular milking parlor elements allows transport of large numbers at the same time. This leads to a fast building up of a new milking parlor.

Application of the invention is not limited to the group milking parlors indicated. With modifications they may be employed in carousel milking installations as well. Milking parlor modules and operation modules may likewise be employed therefor.

In respect of the method problem, the present invention indicates a method of manufacturing a milking parlor with a work area for an operator of the milking parlor and a platform that is elevated relative to said area and forms a standing and walking area for the animals to be milked, wherein firstly, a raised foundation is built as part of the platform, thereafter a substructure is attached to the foundation on the side facing the work area. Said substructure leaves a utility space beneath the standing or work area and above said utility space it creates formwork. Finally in another process step, a curable substance is applied on the foundation and the formwork which, after curing or hardening, forms a uniform floor plate as a homogeneous covering of the substructure and the foundation. Preferably at least part of the substructure is manufactured of a fiber-reinforced material.

The present invention will now be described in detail by way of an exemplary embodiment with reference to the drawing.

BRIEF DESCRIPTION OF THE DRAWINGS

FIGS. 5a-e are perspective views of covering elements placed on the load-bearing elements;

FIGS. 9a-e are views of an operating device in different movement phases;

FIGS. 10a-f are views of a closing unit in different movement phases;

DETAILED DESCRIPTION OF THE PREFERRED EMBODIMENTS

Figure 1:
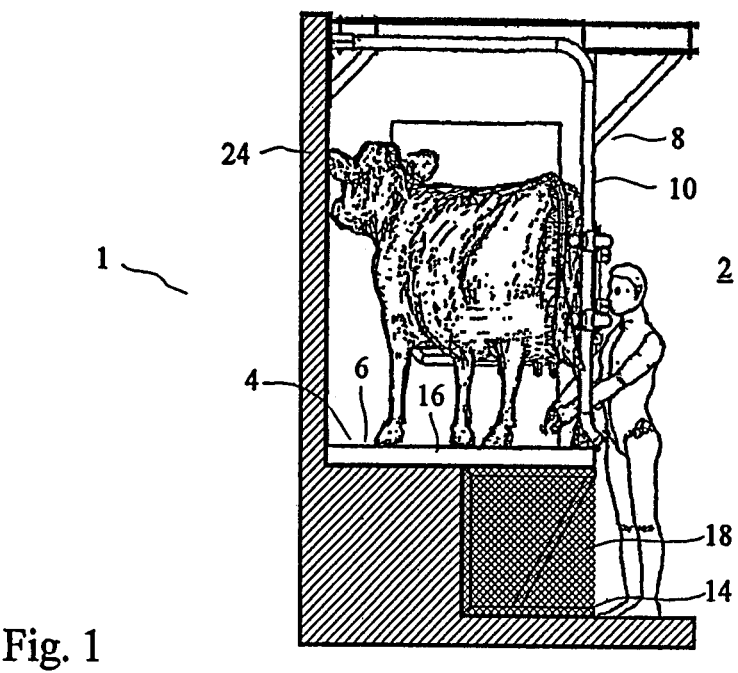
FIG. 1 is a cross-sectional view of an embodiment of a milking parlor according to the invention.

FIG. 1 shows a cross-sectional view of an embodiment of an inventive milking parlor 1 with a work area 2, in which an operator is schematically illustrated, and a platform 4 elevated relative to the work area 2 on which an animal to be milked in the shape of a cow is shown. Said cow is standing on the standing and walkway 6 formed by the platform 4. The cow shown on the platform 4 is at a milking place, taking up substantially the entire width of the platform 4. The shown embodiment is a herringbone milking parlor on which a plurality of cows are standing in the milking places parallel to one another but oblique to the walkway direction of the milking parlor 1 and which does not comprise a separate walkway alley over which the animals to be milked can enter individual milking places. However, the inventive milking parlor can also be realized in such embodiments.

In the cross-sectional view the animal to be milked is confined above and to the side by a milking parlor frame 8 which forms a barrier grid 10 on the edge on the work area side of the platform 4. Said milking parlor frame 8 is nailed to a wall 24 of the milking parlor 1 with its top end which is the outwardly end relative to the work area 2. The other end of the milking parlor frame 8 is connected with the platform 4.

The platform 4 comprises a brick-built or cast-concrete, stationary foundation 12 and a substructure 14 disposed on the side of the foundation 4 facing the work area 2. The foundation 12 and the substructure 14 are the same in height, being provided in approximately the same width. In other words, the width of the platform 4 is defined half by the foundation 12 and half by the substructure 14. Above the foundation 12 and the substructure 14, a floor plate 16 can be recognized which covers a utility space 18 formed by the substructure 14 and accessible from the side, i.e. from the work area 2.

Figure 2:
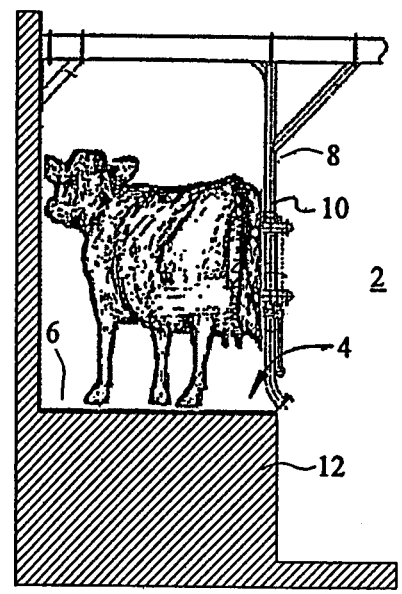
FIG. 2 is a cross-sectional view of a conventional milking parlor.

As regards the conventional structure of the milking parlor 1 shown in FIG. 2, similar components or areas have the same reference numerals. One can see in the cross-sectional view that the platform 4 on the whole is formed by a solid foundation 12 which forms the standing and walkway 6 directly, i.e. without a separate floor plate.

In the FIGS. 3a to g the essential steps for manufacturing the milking parlor 1 are shown, in particular for manufacturing the milking parlor platform.

Firstly (FIG. 3a) the foundation 12 is cast or built in bricks, to a height beneath the finished height of the standing and walking area which is presently indicated by the bottom edge of a wall opening 20. The foundation 12 is firmly attached to the floor 22 or the wall 24 of the milking parlor in a known way.

Figure 4:
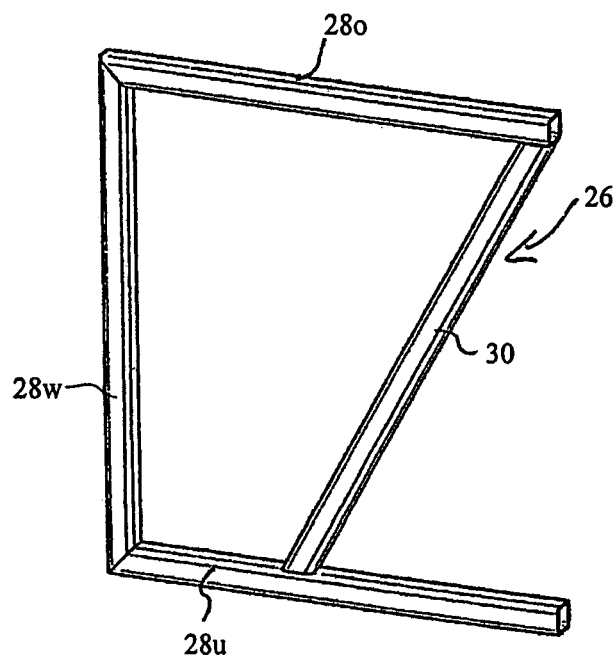
FIG. 4 is a perspective view of an embodiment of a load-bearing element in accordance with the present invention.

Thereafter, on the foundation side facing the work area 2 the substructure 14 is formed which presently (see FIG. 4) is formed by identically configured load-bearing elements 26. Each load-bearing element 26 comprises profile segments 28 fixed at right angles and identical in shape which are preferably welded to one another. The lower profile segment 28u forms a mounting surface of the load-bearing element 26 to the floor 22. The profile segment 28w extending at a right angle thereto forms a mounting surface for the side wall of the foundation 12 facing the work area 2. The outwardly edge of the top profile segment 28o has a strut 30 welded to it showing downwardly at an incline, whose other end is connected with the bottom profile segment 28u and which is configured such that vertical forces imparted on each load-bearing element 26 can be introduced into the foundation 12 through the load-bearing element 26.

Figure 3A:
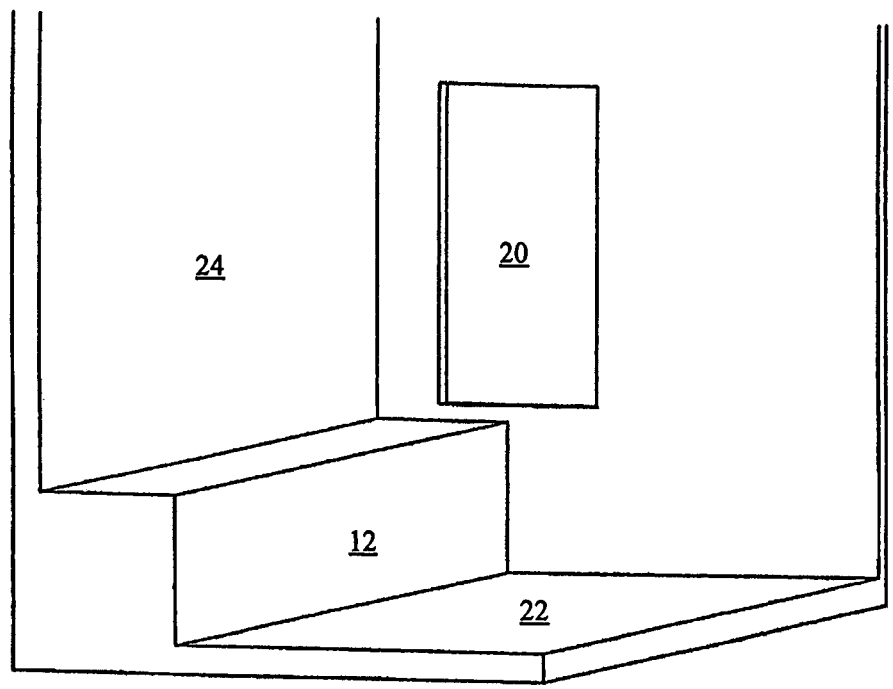
FIGS. 3a-g illustrates process steps for building up the embodiment shown in FIG. 1 in accordance with the present invention.
Figure 3B:
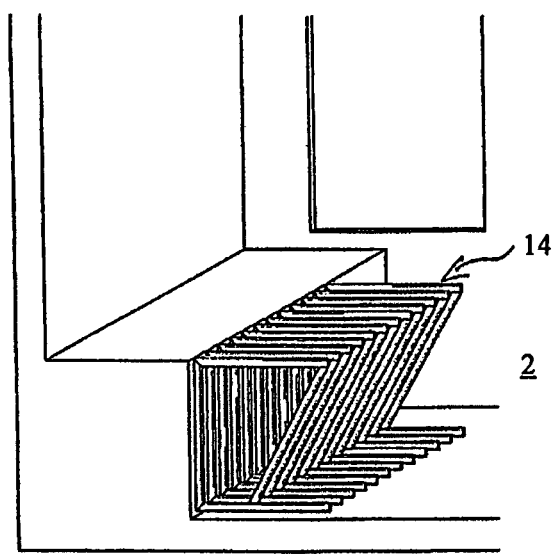

As can be taken from FIG. 3b, all of the load-bearing elements 26 are identical in structure so as to make manufacture very economical. They are further provided, in the embodiment shown, at equal distances from one another in the longitudinal direction, i.e. in the drive-through direction of the animal to be milked.

Other than load-bearing elements 26 of metal profiles, they may be configured of plastic, in particular fiber-reinforced and specifically glass fiber-reinforced plastic.

Figure 3C:
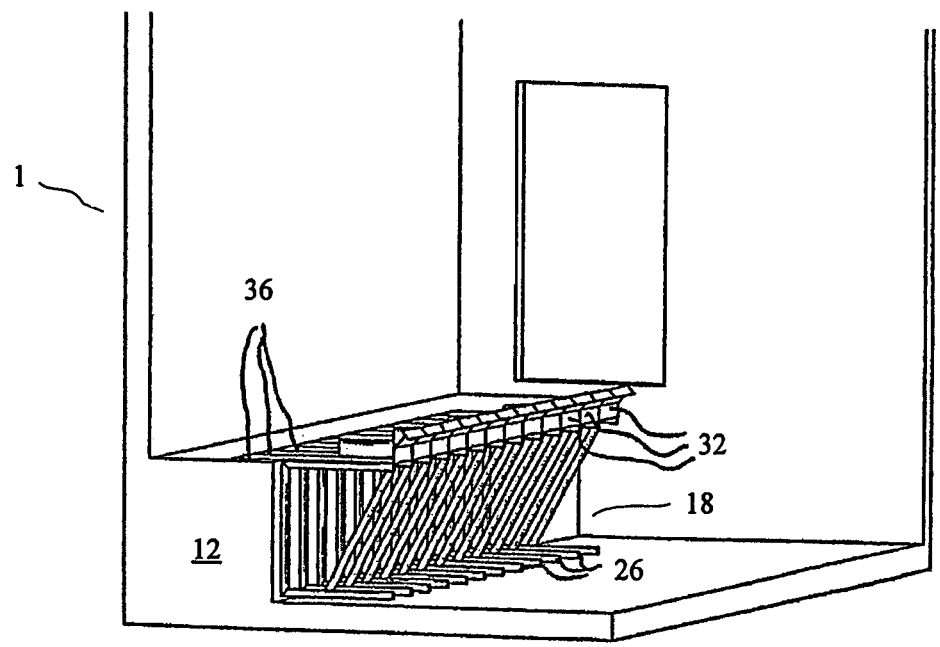

In another process step shown in FIG. 3c, covering elements 32 are attached to the top surface of the load-bearing elements 26, which are configured in identical basic shapes as are the load-bearing elements 26 so as to bridge the identical lateral distances of adjacent load-bearing elements 26. Said lateral distance may for example be 40 mm (1.6 inches) for a milking parlor for cows.

In their modular basic shape (see FIGS. 5b, 5c) the covering elements 32 are substantially L-shaped in cross-section, wherein a front face 34 firstly forms a right angle away from a covering face 36 that extends parallel to the top profile segment 28 and furthermore it is angled outwardly to form a bordered pit edge segment 38. The bottom face of the covering surface 36 has retaining bridges 40 formed thereon, whose distances to one another correspond to the distance of opposite top profile segments 28o in the longitudinal direction of the milking parlor 1.

The FIGS. 5d and 5e show a modification of the basic shape of the covering element 32 discussed above with reference to the FIGS. 5b, 5c. In this modification the covering surface 36 comprises one (or multiple) aperture(s) 42 configured can-like, i.e. surrounded by a cylindrical border 44, presently round in cross-section. The cylindrical border 44 is the same in height as the front face 34 which extends at a right angle from the covering surface 36.

The covering elements 32 are—as can be taken from FIG. 3c—larger in width than the load-bearing elements 26, extending correspondingly up until the top surface of the foundation 12. When the covering elements 32 have been placed on adjacent load-bearing elements 26, the retaining bridges 40 bear against the inner side faces of the profile segments 28, thus fixing the covering elements 32 in the longitudinal direction of the milking parlor 1. The length of the retaining segments 40 is preferably selected such that they fix the covering elements 32 in the transversal direction as well, such that the extension of the front face 34 is flush with the work area side end of the load-bearing elements 26.

To configure one individual milking place, one of the embodiments of the covering elements shown in FIGS. 5d, 5e and several covering elements disposed adjacent thereto, are arranged on the load-bearing elements 26 as shown in FIGS. 5b, 5c. This arrangement is repeated corresponding to the quantity of milking places to be provided on the platform one behind the other in the longitudinal direction. The length of the milking place pit and correspondingly the length of the platform 4, i.e. the distance between opposite walls receiving the respective wall openings 20, is preferably selected such that said distance may be tightly covered by a plurality of identically configured covering elements 32.

Figure 3D:
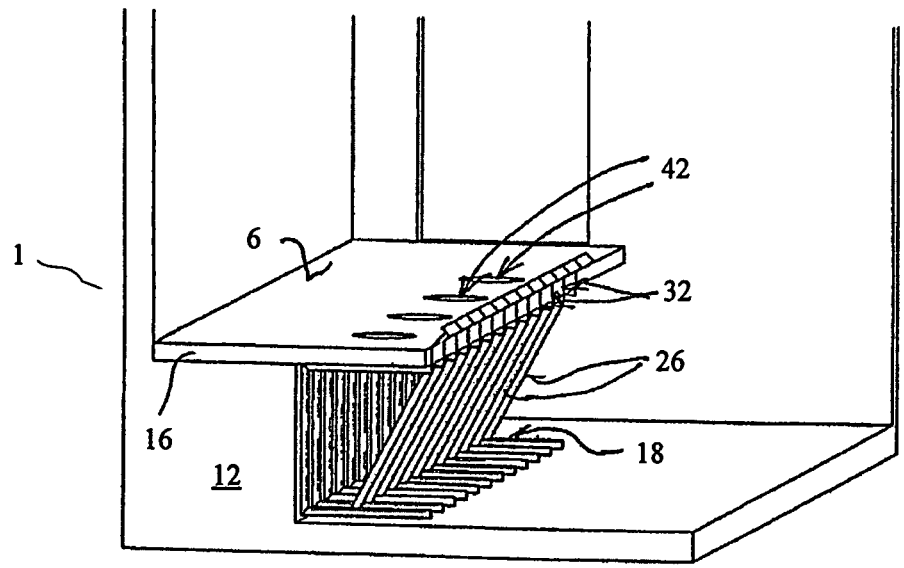

In another process step, a curable substance such as concrete is applied on the top surface of the covering elements 32 and the cast foundation 12, so as to form the floor plate 16 after hardening (see FIG. 3d). The floor plate 16 is configured at the height of the cylindrical border 44 above the covering surface 36 which is identical to the height of the front face 34. Accordingly the floor plate 16 passes without any step into the aperture 42 whose edge is formed by the cylindrical border 44. When the floor plate is cast, the covering elements 32 thus serve as formwork. In the case of a cast-concrete floor plate 16, a skidproof finish may be applied, for example a so-called "Cover Safe", on the top surface of the floor plate 16 to ultimately form the standing and walkway 6. It is now flush with the bottom edge of the wall opening 20 (see FIG. 3d).

By way of the cast floor plate 16, which may additionally be reinforced, a spot load applied by a leg of the animal to be milked is evenly distributed across the platform 6. Furthermore the covering elements 32 are connected to form a unit. Finally, by way of the floor plate and the finish applied on top, an even standing and walking area is formed that complies with hygiene requirements.

Figure 3E:
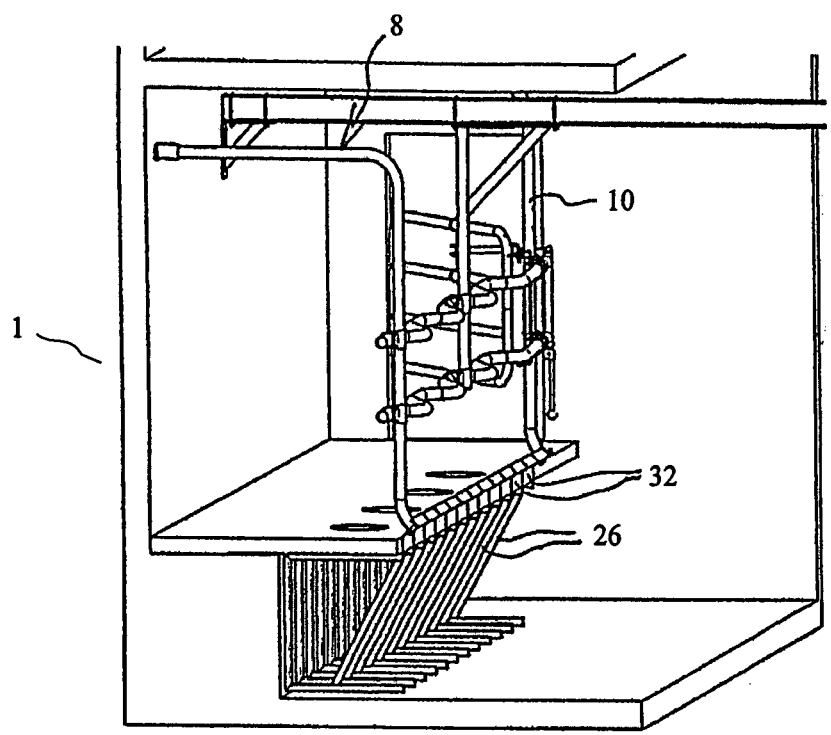
Figure 3F:
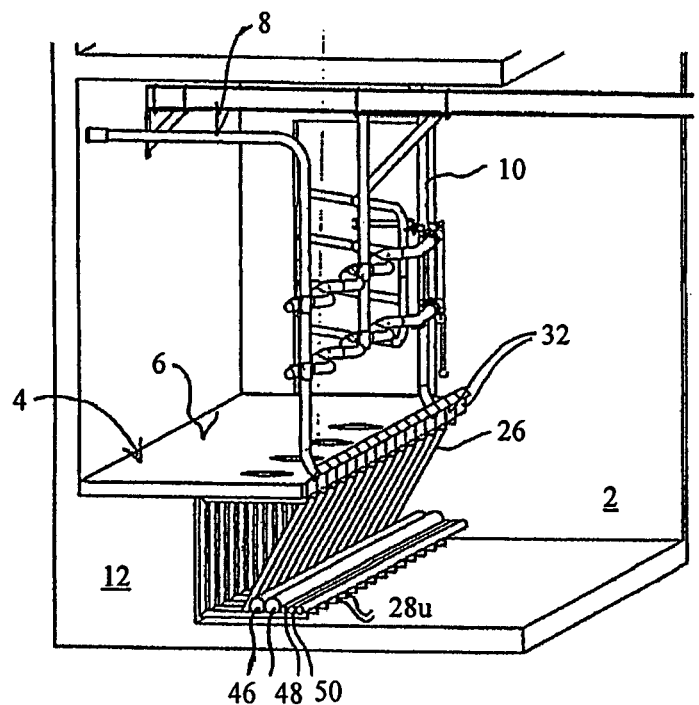

In another process step shown in FIG. 3e the milking parlor frame 8 is now mounted. Said milking parlor frame 8 may be configured conventionally. Alternatively the frame may be adapted such that it is for example mounted with receiving elements routinely provided at the covering elements 32. Said receiving elements may for example be formed in a previous step on all or a selected number of covering elements 32. In this way the platform side receiving elements for the milking parlor frame 8 may also be manufactured in series in industrial quantities before assembly such that the milking parlor needs only to be assembled in simple steps.

Now (see FIG. 3f) a number of lines 46 are mounted on top of the bottom profile segments 28u, for example for compressed air, milk, milk to be discarded, water, vacuum, rinsing media and disinfectants and the like. Furthermore electric supply lines 48 and cable ducts 50 for data transfer lines may be mounted. Mounting occurs in the front area of the bottom profile segments 28u, i.e. in the longitudinal segment on the side of the strut 30 facing the work area 2. At least in this place the bottom profile segments 28 are preferably configured as U-shaped grooved elements so as to facilitate mounting the lines 46, 48 and the cable ducts 50. All of the media lines 46 are provided with standardized push-pull locking elements at specific modular points. Said push-pull locking elements are placed at cyclic intervals corresponding to the number of milking places provided consecutively in the longitudinal direction (in the shown embodiment, four places). The positions of the push-pull locking elements preferably provided between the load-bearing elements 26, is dependent on the positions of various operation modules 52 illustrated schematically in FIG. 3g.

In the illustrated embodiment the operation modules 52 are identical in their dimensions, configured substantially U-shaped. The bottom leg 54 of the operation module 52 forms a support surface for the operation module 52 as a bearing relative to the floor 22. The bottom legs 54 may preferably form a guide with the adjacent load-bearing elements 26 to facilitate the precise positioning of the operation modules 42 and in particular to allow connecting the media ducts with the operation modules 52 when these are inserted between the load-bearing elements 26.

Figure 3G:
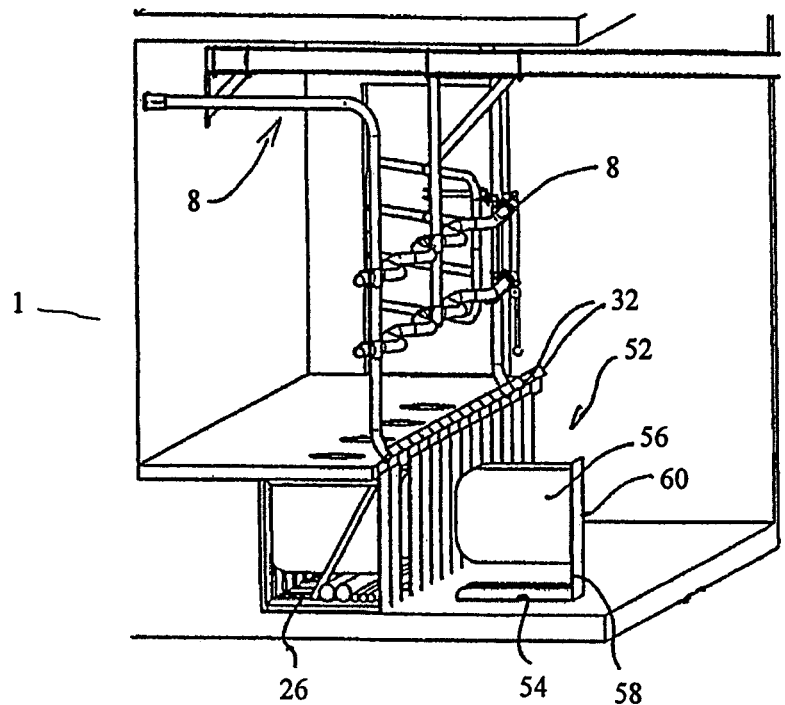

The top leg 56 of the operation module 52 extending substantially horizontally forms a housing for components of the milking parlor 1 which are now explained by way of example with reference to a few embodiments of operation modules. The top and bottom legs 54, 56 are connected with one another through a bridge 58 (FIG. 3g). The outside of the bridge 58, i.e. the side of the operation module 52 facing the work area 2, is clad in a covering 60 whose longitudinal sides are flush with the edges of the covering elements 32 when the operation module 52 is inserted between adjacent load-bearing elements 26. Correspondingly, the coverings 60 of all of the inserted operation modules 52 form a uniform side wall which separates the utility space 18 formed beneath the standing and walking area from the work area 2. Over the height, the covering 60 extends between the floor 22 and the bottom face of the covering elements 32 where it seamlessly passes into the front face 34 of the covering elements 32 (see FIG. 6). The bridge 58 and/or the covering 60 of the U-shaped operation modules 52 may moreover comprise input and/or display elements or interfaces for the elements disposed in the operation module, i.e. installation elements of the milking parlor 1, for which the covering 60 is provided with apertures.

In the embodiment discussed above, each milking place is provided with up to three operation modules A to C (see FIG. 6) which will now be described. The module A (see FIG. 7) is a so-called sensor module which may comprise the essential control elements and evaluation and analysis elements for milking. For example a milk analysis device may be provided in the sensor module A for analyzing the milk extracted at the milking place. Furthermore, the milk yield may be measured. Furthermore, sensors may be provided for analyzing the milk constituents and in particular for generating a signal by means of which the milk extracted at the specific milking place is prevented from entering the central milk line if the extracted milk does not meet the required quality criteria. In the covering 60 there may further be provided an LED display and possibly a graphical display which inform the operator of the essential operation and monitoring parameters of the milking place. Finally an interface for reading out said parameters may be provided on a computer carried by the operator which preferably allows wireless data transfer. Furthermore a docking station may be provided to attach a handheld unit to.

Figure 8:
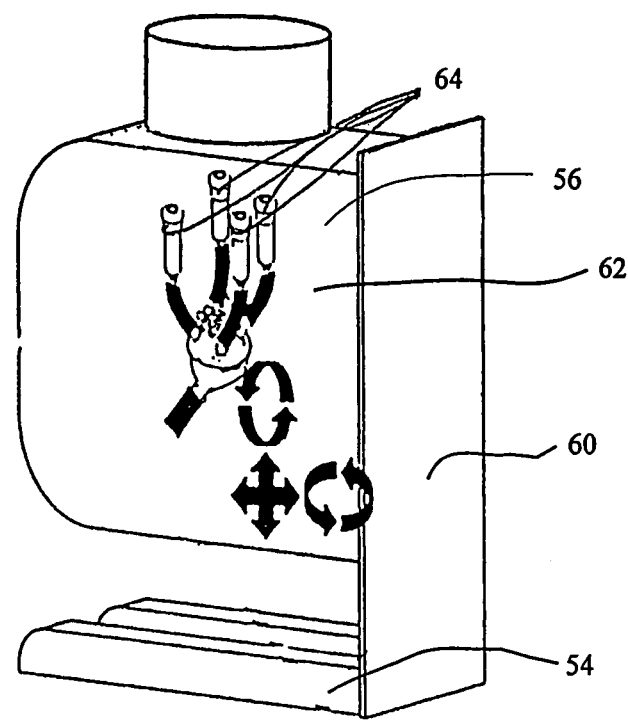
FIG. 8 is a perspective, schematic view of a second embodiment of an operation module in accordance with the present invention.

FIG. 8 schematically shows a milking unit module B comprising as the essential component a milking unit 62 having four teat cups 64. Said milking unit module comprises for example an operating device 66 for lifting out the milking unit 62 (see FIGS. 9a to 9e), and in its basic version it furthermore surrounds a closing unit 68 to cover the aperture 42 in a non-use position of the teat cups 62, i.e. when the teat cups 62 are located in the milking unit module A.

The operating device 66 (FIG. 9) comprises a pivoted arm 70 whose bottom edge is slidably guided in a guide 72 extending substantially horizontally and recessed in a guide plate 74 disposed on the bottom of the top leg 56. The operating device 66 further comprises an articulated arm 76 which interacts with the pivoted arm 70 in a scissors-type drive and when one end of the pivoted arm 70 moves the length of the guide 72, the pivoted arm 70 is caused to perform a pivoting movement so as to raise or lower the free end carrying a teat cup magazine 78. Correspondingly the teat cups 64 held in the teat cup magazine 78 are lowered into the milking unit module B or lifted in the direction of the aperture 42 or lifted out of it, where the operator may grasp them to place them on the animal to be milked.

In the non-use position of the teat cups 62, i.e. with the pivoted arm 70 in the lowered position, the aperture 42 is closed by the closing unit 68 (see FIGS. 10a to 10f). The closing unit 68 comprises a plate-shaped pivoted element 80 which is pivotally mounted preferably on the side wall of the foundation 12 and can be inserted into it through an opening formed in the milking unit module B. In the recess of the pivoted element 80 there is a pivotally supported covering lid 82 which can be inserted flush into the aperture 42. In this closed position (see FIG. 10f) the closing lid 82 seals the aperture 42. Between the closing lid 82 and the aperture 42, a sealing edge is formed preferably by the cylindrical border 44 to prevent dirt and fluids from entering the module B through the closing lid 82.

In the rest position shown in FIG. 10a the pivoted element 80 extends substantially parallel to the side wall of the foundation 12, wherein the closing lid 82 has been inserted substantially between the pivoted element 80 and the side wall of the foundation 12 by way of a pivoting movement. To close the aperture 42, firstly the pivoted element 80 is pivoted 90° and secondly the closing lid 82 is pivoted approximately 180° relative to the pivoted element 80. In this position the closing lid 82 protrudes from the pivoted element 80 by means of a lid support 84 which can be seen in FIG. 10c.

Other than the components discussed above the milking unit module B may comprise a manipulator for automatic placement.

Figure 6:
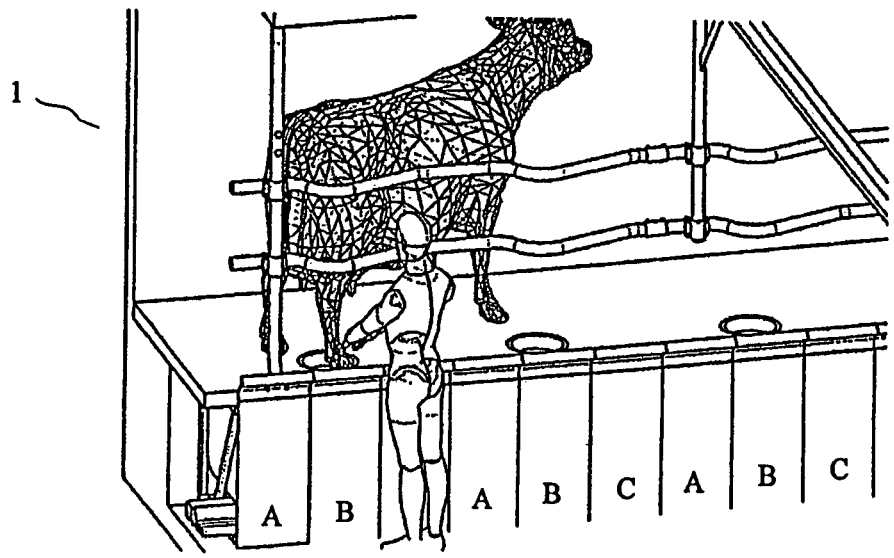
FIG. 6 is a perspective view of an embodiment of the inventive milking parlor according to FIG. 1.
Figure 7:
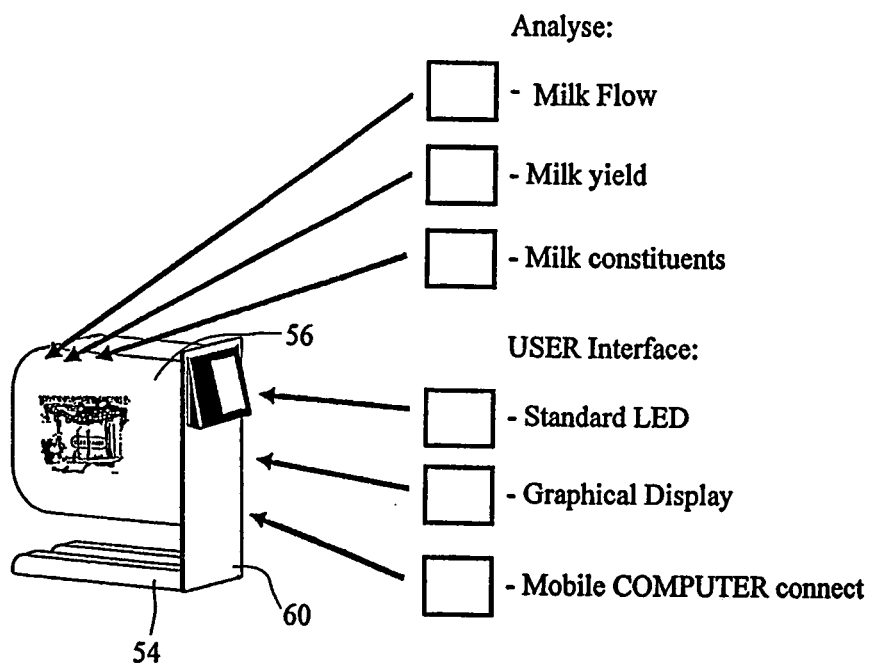
FIG. 7 is a perspective, schematic view of a first embodiment of an operation module in accordance with the present invention.

The third module C indicated in FIG. 6 but not illustrated in detail is configured as a so-called milking module (C), having the same dimensions as the operation modules A and B. The milking module C comprises the key installation parts and devices needed per milking place to carry out a milking procedure. The milking module C in particular comprises a pulsator and/or a stimulator. Furthermore the module comprises an intermediate disinfecting device and a cleaning device for the teat cups of the milking unit module B connected via connecting lines. The milking module C may further comprise a milk separator, a milk pump and if required an evacuator, to thus reduce the quantity of media lines received in the utility space. Furthermore, configuring these separate, stand-alone installation elements per milking place significantly increases the availability of the entire plant since failures in the plant are confined to the particular milking place but do not affect the entire milking installation.

The modules A to C indicated above comprise standardized interfaces for connecting the modules A to C with the media, data transmission, and electric supply lines installed in the utility space. In addition, interfaces are provided for coupling adjacent modules of a milking place with one another. Said interfaces may be provided between opposite side faces of the modules A to C. In this case it is preferred to provide removable coverings 60 at the operation modules 52, so as to make said intermediate space accessible when the modules A to C have been inserted into the utility space 18. Alternatively the supply lines indicated above may be provided between the top and bottom legs 54, 56 of the modules A to C and connected by way of inserting the modules A to C into the utility space 18. In other words, the corresponding line is preferably connected with the module by default as it automatically actuates a covering lid 82, closing the line when being inserted and as the inserting movement is complete, the push-pull locking element of the line interacts with a mating module element so as to be fluid-tight. The data transmission interfaces are also standardized and equipped such that any and all of the conceivable modes of operation and components of the installation are mounted in the operation modules 52 and ready to operate. In a simplified configuration, i.e. a lower-class configuration, only specific interface channels of the interfaces are occupied.

Figure 11:
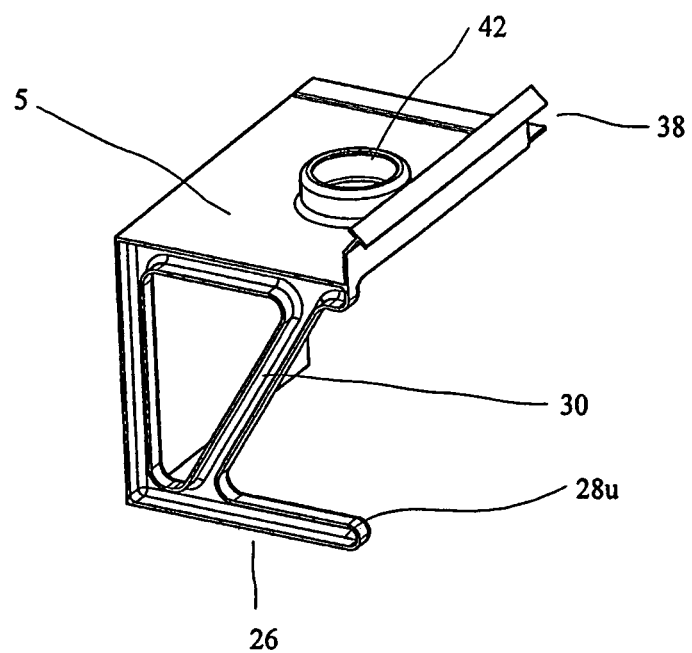
FIG. 11 is a view of a single milking parlor module.

The group milking parlors from the previous embodiments may consist of multiple milking parlor modules 5, one of which is illustrated in FIG. 11. The milking parlor module 5 comprises a closed top surface in which an opening or aperture 42 may be provided to pass a milking unit through. At the end facing the milker pit, a bordered pit edge segment 38 may be provided. Each milking parlor module 5 may comprise one or two load-bearing elements 26 or it may be integrally manufactured therewith. One load-bearing element 26 of the milking parlor module 5 may comprise a strut 30. On the whole, two different milking parlor modules 5 may be provided, some of which with struts 30 and others without. The bottom profile segment 28u in turn forms a mounting surface of the load-bearing element 26 for the floor 22 of a milking parlor 1.

Figure 12:
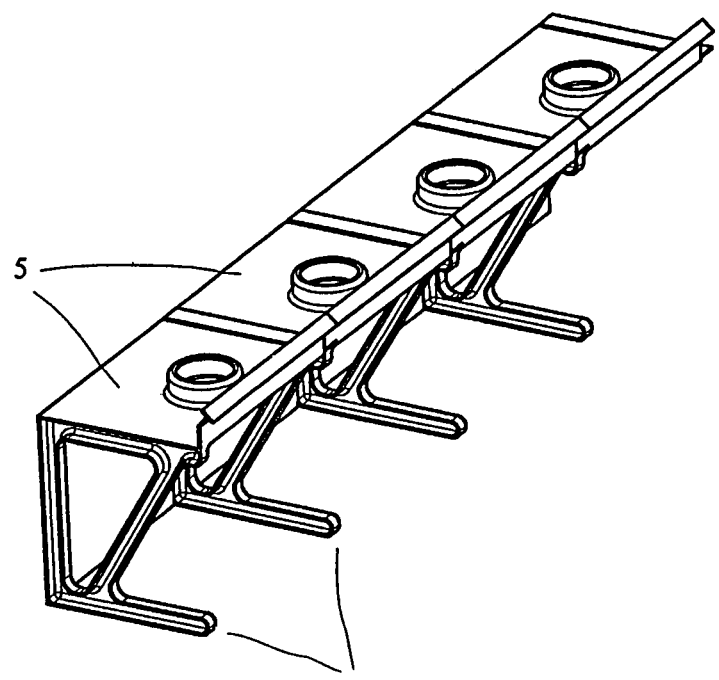
FIG. 12 is a view of a plurality of milking parlor modules according to FIG. 11.

To build a milking parlor 1, multiple milking parlor modules 5 are placed adjacent and then connected to one another as illustrated in FIG. 12. While the individual modules may comprise the openings 42, this is not obligatory. It depends on the layout of the milking parlor.

In the embodiment illustrated in the FIGS. 13 to 16, modular elements 25 are employed which together provide the substructure 14 of a milking parlor including the floor of the milker pit. The modular elements 25 extend on both sides of the milker pit, forming part of the substructure 14 on both sides. The two sides are connected with one another by way of a center portion 27. This allows a particularly simple building of a milking parlor because the modular elements 25 can be lined up to form the substructure on both sides of the group milking parlor which may further serve as the formwork for casting concrete.

Figure 13:
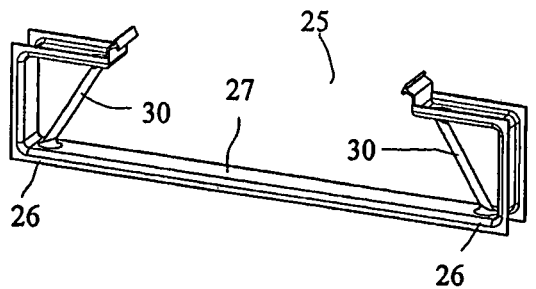
FIG. 13 is a view of a single milking parlor element.
Figure 14:
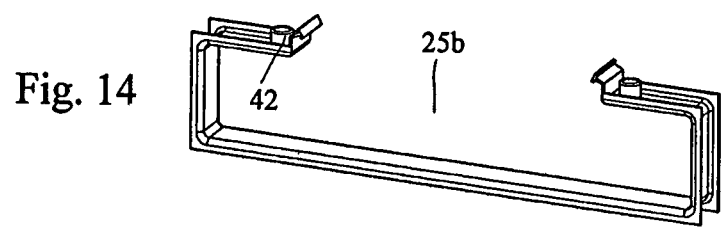
FIG. 14 is a view of a plurality of milking parlor elements according to FIG. 13.

As can be taken from the FIGS. 13 and 14, a modular element 25 or 25b may or may not be provided with an aperture 42. Both types may or may not be provided with struts 30. A suitable sequence of modular elements provided with struts and of modular elements without a strut 30 guarantees the desired and required stability.

Figure 15:
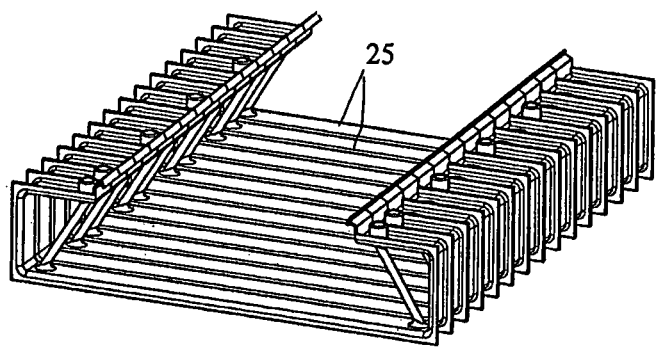
FIG. 15 is a view of a plurality of interconnected modular elements 25.
Figure 16:
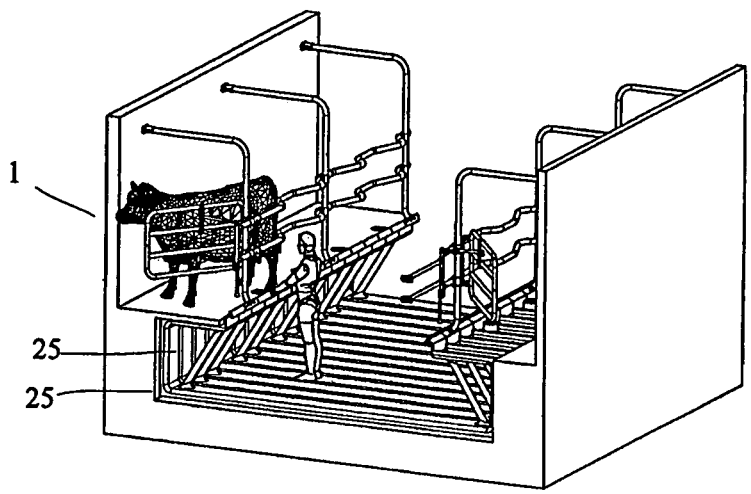
FIG. 16 is a view of a milking parlor of milking parlor elements according to FIG. 13.

A plurality of interconnected modular elements 25 is shown in FIG. 15. FIG. 16 illustrates a group milking parlor 1, which is presently configured as a herringbone milking parlor.

One advantage is a cutback in concreting work on the construction site. Furthermore the precise width of the milking parlor pit can be obtained as specified.

Other than substructures formed of steel components, the forming of fiber-plastic composite materials is preferred as well. Fiber-reinforced plastic or fiber-plastic composite material is a material consisting of reinforcing fibers and e.g. a polymer plastic matrix. The matrix surrounds the fibers which are connected with the matrix by way of adhesive forces. The reinforcing fibers may be introduced into the composite e.g. as a fleece or woven sheet and thereafter filled or coated with the matrix system (e.g. epoxy resin, laminating).

It is therefore preferred in all of the embodiments to manufacture particular parts of the substructure, in particular at least part of the modular elements 25, the load-bearing elements 26, the center portions 27 and the milking parlor modules 5 or the entire platform 4 of a fiber composite material, at least in part.

A use of fiber-reinforced plastic fulfills many requirements for substructure elements. What is made possible is e.g. a high number of functions integrated in a small number of components. In this application a skillful structure of the component may realize in one single component, an incorporation of the supporting structure to support the milking parlor floor, and simultaneously incorporation of the formwork areas for subsequent concreting. It is also possible and preferred to immediately incorporate molded parts for holders, rail systems, etc.

Another advantage is the variability of the milking parlor size and in particular the variability in the number of places. By way of configuring a substructure element as a module with the option of multiple uses, the milking parlor size can remain a variable magnitude. Depending on the desired number of milking places the corresponding number of modules is joined to one another. The low weight is another advantage. Due to the inherent high, weight-specific strength and rigidity of fiber-reinforced plastic, large components may be manufactured having a very low weight, which facilitates transport of such molded elements to the customer and handling said molded elements on the construction site.

Moreover the elements may be matched to the geometric specifications of milking systems to be installed later. If the specific, geometric requirements (dimensions, shape, connection surfaces, etc.) are complied with, said formwork elements also contain the geometric information for later installation of the milking parlor system technology. These elements can thus be quickly and safely assembled on site to build an entire milking parlor formwork. Thereafter, concrete is applied in one step. After the concrete is set, the formwork elements of the fiber-plastic composite remain in the milking parlor. In this way one can build a milking parlor pit on site in the shortest possible time which already comprises the precise dimensions, shape, connection surfaces required for the milking parlor to be installed.

The material-inherent, high weight-specific strength and rigidity also allow to manufacture formwork elements capable of dispersing or absorbing the loads imparted by the animals on the platform.

Another advantage is freedom of form for the components. The laminating manufacturing process e.g. for carbon fiber reinforced plastic (CFRP) further offers the option of manufacturing freeform surface formwork elements.

When manufacturing the variant for the two milking parlor sides of group milking parlors according to FIGS. 13 to 16 with fiber reinforced plastic, large though lightweight formwork elements may be made which allow the immediate building up of two milking parlor sides.

The invention claimed is:

1. A milking parlor comprising:
    a work area;
    a substructure adjacent to the work area and formed by a plurality of load bearing elements spaced apart in a longitudinal direction of the milking parlor;
    a platform above the substructure and elevated relative to the work area, and the platform forms a standing and walking area for animals to be milked, wherein the platform and the substructure define a utility space beneath the platform and adjacent and open to the work area;
    a media line disposed at least partially in and extending in a longitudinal direction in the utility space;
    a plurality of operation modules disposed at least partially in the utility space; and
    a covering element joined to the platform.

2. The milking parlor according to claim 1, wherein the utility space extends in a longitudinal direction of the milking parlor.

3. The milking parlor according to claim 1, wherein the substructure comprises milking parlor modules.

4. The milking parlor according to claim 1, wherein the load-bearing elements are spaced apart at an equal distance from one another and two of the load-bearing elements support a covering element.

5. The milking parlor according to claim 4, wherein the covering element seals an upper side of the utility space.

6. The milking parlor according to claim 4, wherein the covering element comprises a bordered edge disposed between the standing and walking area and the work area.

7. The milking parlor according to claim 1, and further comprising:
    an electric supply extending in a longitudinal direction of the milking parlor and the electric supply is mounted in the utility space and in communication with the operation modules.

8. The milking parlor according to claim 1, wherein adjacent operation modules comprise mating interfaces.

9. The milking parlor according to claim 1, wherein the operation module comprises:
    a bottom support leg; and
    a top leg disposed above the bottom leg and in which an operation unit is disposed.

10. The milking parlor according to claim 9, and further comprising:
    a cover extending substantially perpendicular to the legs, and facing the work area; and
    input display elements mounted on the cover.

11. The milking parlor according to claim 1, wherein the operation modules are disposed in the utility space and separate the utility space from the work area.

12. The milking parlor according to claim 1, wherein an operation module comprises an operating device having a set of teat cups.

13. The milking parlor according to claim 1, and further comprising:
    an operating device having:
    a pivoted arm having a proximal end slidably and pivotally mounted in a guide;
    a free end; and
    a holding element joined to the pivoted arm's free end.

14. The milking parlor according to claim 1, and further comprising:
    an operating device disposed in an operation module, and the operating device is movable from a non-use position beneath the standing and walking area, to a use position in the standing and walking area.

15. The milking parlor according to claim 1, and further comprising:
    a milking place in the standing and walking area, wherein the milking place corresponds to an operation module; and a pulsator for a milking unit disposed in the operation module.

16. The milking parlor according to claim 1, and further comprising:
a cleaning device for a milking unit, and the cleaning device is disposed in an operation module.

17. The milking parlor according to claim 1, and further comprising:
a milk separator interposed between a milk line and a milking unit of an associated operation module.

18. The milking parlor according to claim 17, and further comprising:
a controller joined to an operation module; and
a sensor wherein the milk separator is controlled by the sensor which analyzes a liquid flowing from a teat cup, and generates and sends a corresponding signal to the controller.

19. The milking parlor according to claim 1, wherein a load-bearing element comprises a fiber-reinforced plastic.

20. The milking parlor according to claim 1, wherein the operation module is made at least partially of a fiber-reinforced plastic.

21. The milking parlor according to claim 20, wherein the fiber-reinforcing plastic includes a fiber selected from the group consisting of:
carbon fibers, glass fibers, basalt fibers, ceramic fibers, metallic fibers, steel fibers, aramid fibers, boron fibers, and combinations thereof.

22. The milking parlor according to claim 20, wherein the fiber-reinforced plastic is a thermoplastic material.

23. The milking parlor according to claim 1, wherein the substructure comprises:
a modular carrier element.

24. The milking parlor according to claim 23, wherein the substructure is formed by a plurality of modular carrier elements.

25. A milking parlor comprising:
a work area;
a substructure adjacent to the work area and formed by a plurality of load bearing elements;
a platform above the substructure and elevated relative to the work area, and the platform forms a standing and walking area for animals to be milked, wherein the platform and the substructure define a utility space beneath the platform and adjacent and open to the work area;
a media line disposed at least partially in and extending in a longitudinal direction in the utility space;
a plurality of operation modules disposed at least partially in the utility space, and
a guide disposed in the utility space slidably engaged with an operation module that is to be inserted from the work area into the utility space.

26. A milking parlor comprising:
a work area;
a substructure adjacent to the work area and formed by a plurality of load bearing elements;
a platform above the substructure and elevated relative to the work area, and the platform forms a standing and walking area for animals to be milked, wherein the platform and the substructure define a utility space beneath the platform and adjacent and open to the work area;
a media line disposed at least partially in and extending in a longitudinal direction in the utility space;
a plurality of operation modules disposed at least partially in the utility space;
an operating device disposed in an operation module, and the operating device is movable from a non-use position beneath the standing and walking area, to a use position in the standing and walking area; and
a closing unit, wherein the closing unit includes a pivotable element for covering an aperture in the platform and a pivotable element extending substantially parallel to the standing and walking area and including a closing lid for covering the aperture, and the closing lid is pivotable relative to the pivotable element and can be inserted into the aperture.

* * * * *